United States Patent
Berry et al.

(10) Patent No.: US 6,338,673 B2
(45) Date of Patent: Jan. 15, 2002

(54) ELECTRICAL ANIMAL STUN/KILL APPARATUS

(75) Inventors: Paul Simon Berry, Bedford; Ambur Balakrishnan Mohan Raj, Bristol; Michael O'Callaghan, Weston-Super-Mare; Lindsay John Wilkins, Langford; David Bernard Tinker, Ampthill, all of (GB)

(73) Assignee: BTG International Limited, London (GB)

(*) Notice: Subject to any disclaimer, the term of this patent is extended or adjusted under 35 U.S.C. 154(b) by 0 days.

(21) Appl. No.: 09/864,225

(22) Filed: May 25, 2001

Related U.S. Application Data

(63) Continuation of application No. PCT/GB99/03972, filed on Nov. 26, 1999.

(30) Foreign Application Priority Data

| Nov. 27, 1998 | (GB) | 9826137 |
|---|---|---|
| Nov. 27, 1998 | (GB) | 9826140 |
| Nov. 27, 1998 | (GB) | 9826142 |

(51) Int. Cl.[7] ................................. A22B 3/06
(52) U.S. Cl. ...................................... 452/58
(58) Field of Search ..................... 452/58, 57

(56) References Cited

U.S. PATENT DOCUMENTS

| 1,935,138 A | * | 11/1933 | Windisch | 452/58 |
|---|---|---|---|---|
| 2,335,993 A | * | 12/1943 | Bland et al. | 452/58 |
| 3,996,644 A | * | 12/1976 | Andersson | 452/58 |
| 4,524,487 A | * | 6/1985 | Goossens | 452/58 |
| 5,326,307 A | * | 7/1994 | Bernardus et al. | 452/58 |
| 5,486,145 A | * | 1/1996 | Dorsthorst et al. | 452/58 |
| 5,704,830 A | * | 1/1998 | Van Ochten | 452/58 |

FOREIGN PATENT DOCUMENTS

| FR | 680889 A | * | 5/1930 | 452/58 |
|---|---|---|---|---|

* cited by examiner

*Primary Examiner*—Willis Little
(74) *Attorney, Agent, or Firm*—Nixon & Vanderhye

(57) ABSTRACT

Apparatus for electrical stunning and killing poultry comprises a conveyor (31) and means for applying electrical voltage across the heads of the birds (3; 37; 42). In one embodiment, means are also provided for applying a voltage between the bird's head and rear by means of a further electrode (4). In this case, a two stage stun and kill process is used, with the bird being stunned by a voltage applied to it across its head and then killed by a voltage applied between its head and rear, causing fibrillation of the heart. The apparatus may also include means (5; 34) for restraining the bird's heads and/or facilitating contact of the bird's heads with the electrodes. The electrodes themselves may take a number of forms, including dry resilient foam covered by a conductive wire mesh, or a number of parallel sprung pins, or a rail along which the bird's heads slide, or a conductive endless belt. A pair of manual stunning tongs (61) is also described.

14 Claims, 8 Drawing Sheets

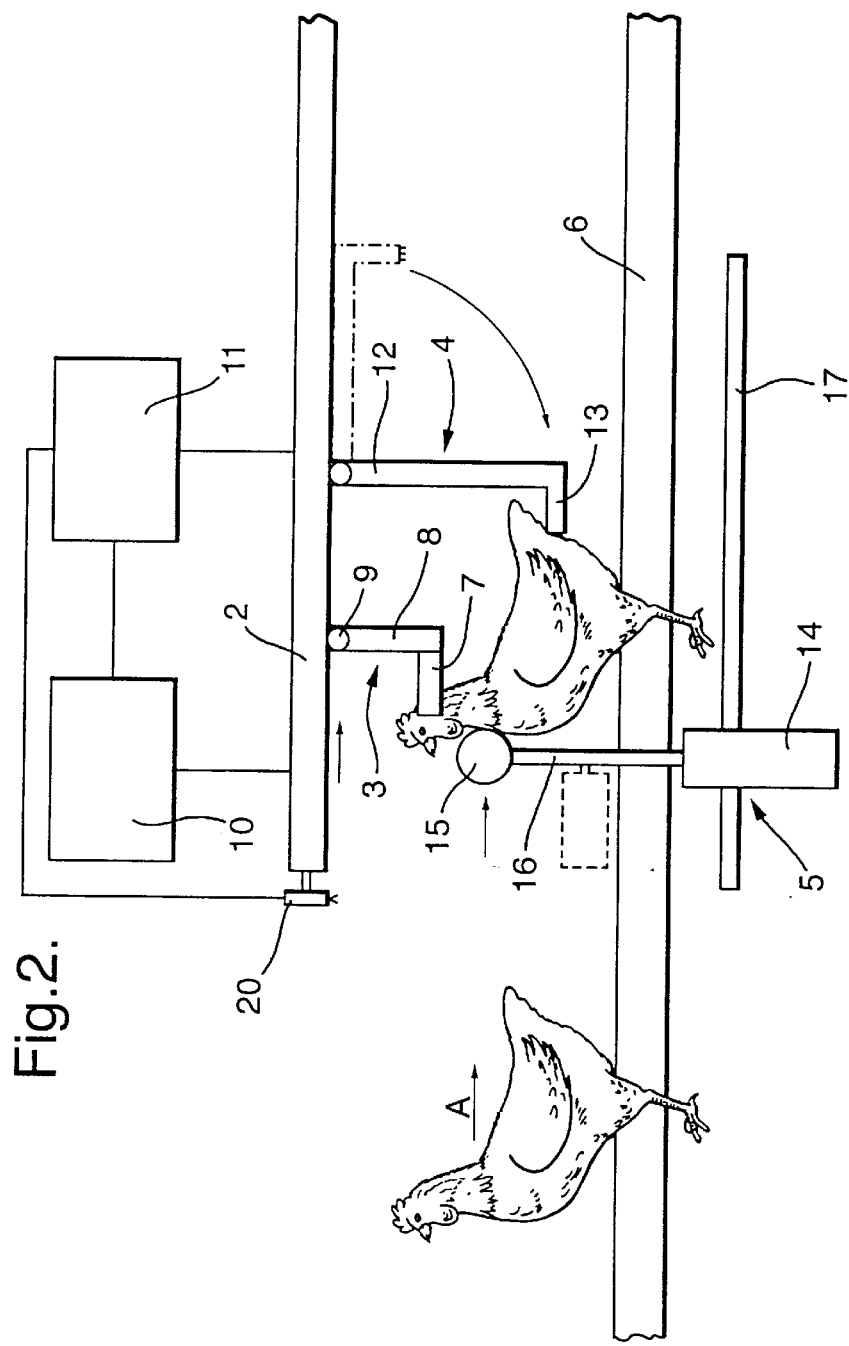
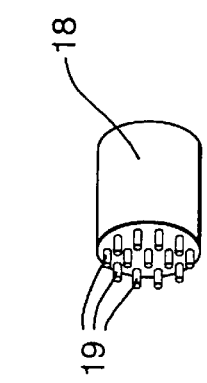
Fig.2.
Fig.2a.

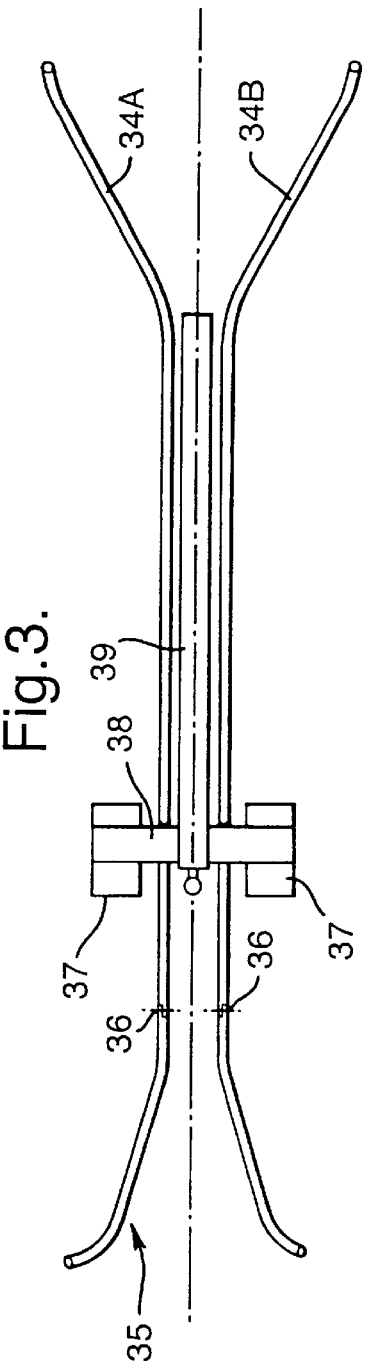
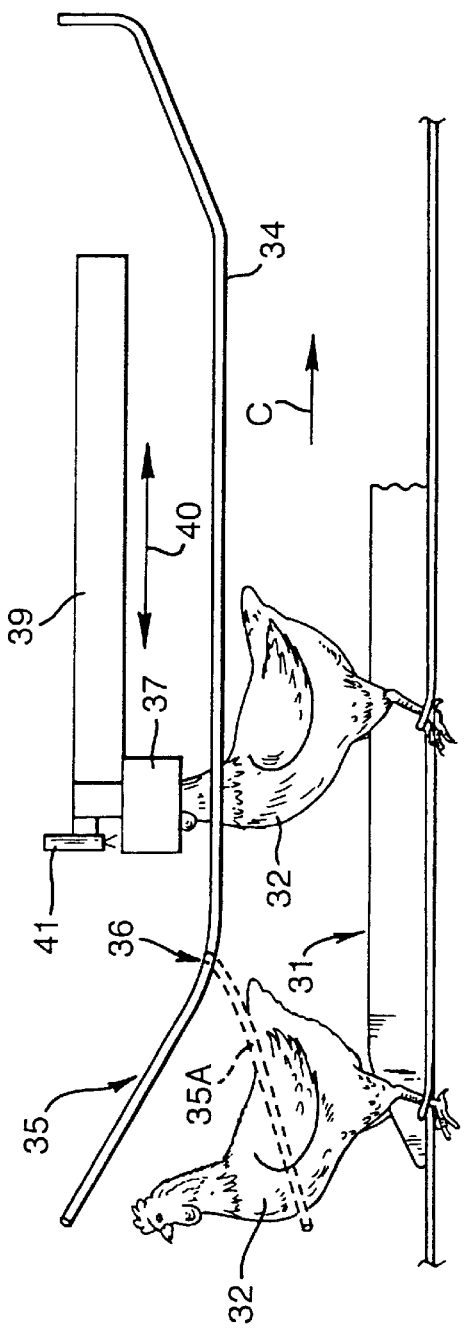

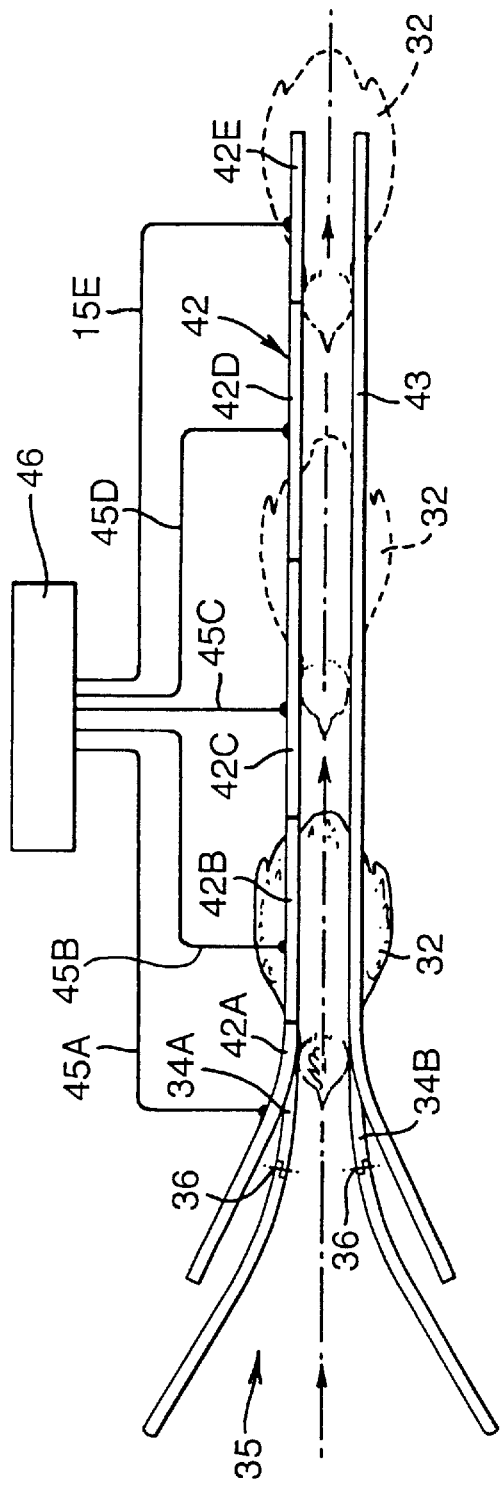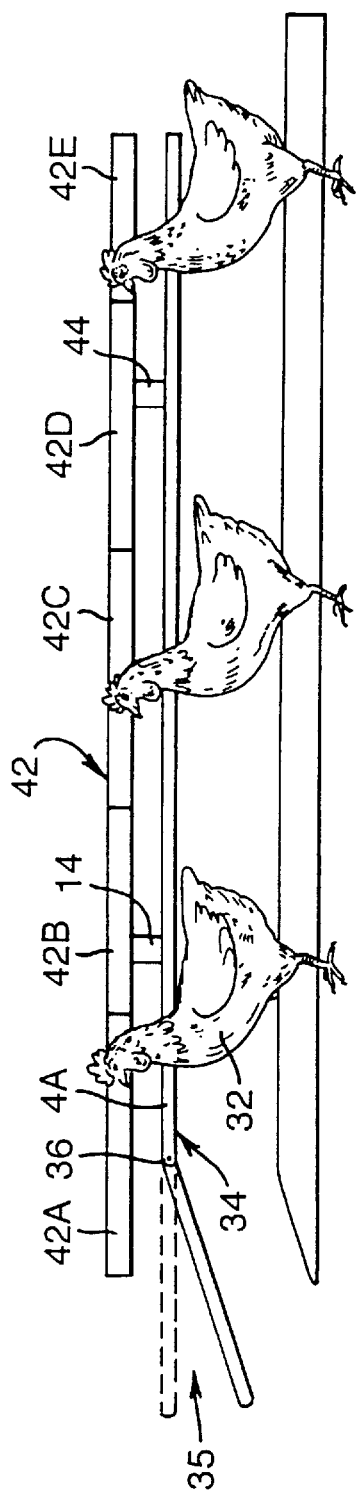

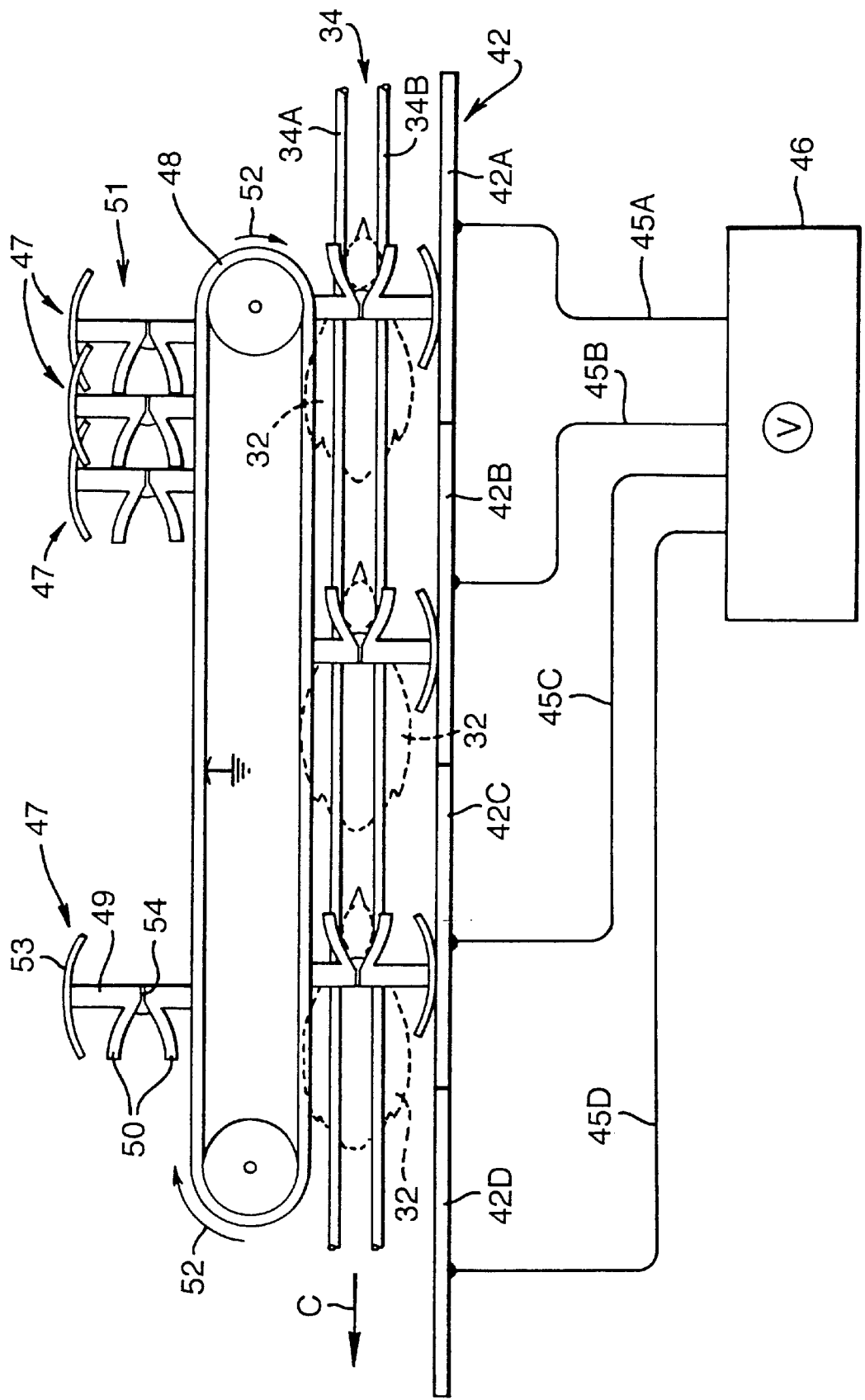

ELECTRICAL ANIMAL STUN/KILL APPARATUS

This appln is a continuation of Ser. No. PCT/GB99/03972 filed Nov. 26, 1999.

The present invention relates to apparatus for stunning and/or killing domestic poultry species electrically. The invention is also applicable to the electrical stunning and killing of ostriches. Although ostriches are not strictly speaking poultry, the term "poultry" as used herein will be taken to include ostriches. In some aspects, the invention relates to the handling and electrical stunning/killing of animals in general. The invention, in all its aspects, is particularly suitable for use with broiler chickens.

Current systems for electrically stunning broiler chickens involve the broiler being suspended by its legs on a moving shackle line. The shackles from which the broilers are suspended are electrically grounded; as the broilers proceed along the line, their heads pass through an electrified water bath, thereby completing the electrical circuit between the shackle and the water bath. An electrical current thus flows through the entire bird from its head to its legs. It is necessary for this current to be maintained for several seconds to achieve an effective stun and, therefore, to achieve an acceptable throughput of broilers, it is necessary that a number of the birds are passing through the water bath at any given time; this number will obviously be somewhat variable.

The above system has several problems, one of which is that, with a variable number of birds completing the electrical circuit between the shackle line and water bath at any one time, the current through any individual bird will vary. This results in some cases in an ineffective stun. In order to solve this problem, a system has been developed whereby a constant current passes through each individual bird irrespective of the number of birds passing through the water bath at any one time. The system is described in co-pending international patent applications numbers WO 97/1283 and WO 97/01284, each assigned to the applicant of the present application.

Whilst the system referred to above is very effective in that it ensures that each bird completes a separate electrical circuit, there are still problems with the water bath method of electrocution. The current passing through each bird can still be unpredictable because the path which the current takes is not always predictable; for example one of the birds' wings may touch the surface of the water bath providing an additional current path. The systems in use at the moment also require a relatively high voltage, of the order of 200 volts, and it would be desirable if this could be reduced.

At present, in poultry systems at least, electrical methods are generally used only for stunning. The neck of the stunned bird is then cut and the bird dies through exsanguination. This procedure has been followed for a number of reasons, including the fact that there is a generally held view that the amount of blood draining from the bird's body is increased if the bird's heart is still beating when the neck is cut. It has been determined through experimentation with poultry that, whilst the initial blood flow rate is higher if the heart is beating when the neck is cut, the amount drained is no different if the heart has stopped beating.

A system is currently in use with pigs which involves applying to the head a voltage sufficient to stun the animal and then applying an electrode to the chest to induce a current through the heart to cause death by fibrillation.

This method would be unsuitable for use with poultry because it may have a negative effect on the quality of the breast meat. This problem does not arise in pigs and other red meat animals where the chest area yields very little meat.

The inventors have found, however, that an electrical stun/kill process can be used with poultry by applying the fibrillating voltage using an electrode placed at the rear of the bird rather than on its chest. It is somewhat unexpected that an electrode in this position would produce a flow of current through the heart, and still more surprising that the electrical resistance offered for example between the rear of the bird and its head would be as low as it has been found to be.

It is postulated that the high electrical conductivity of the spinal cord and viscera is in the main responsible for the low electrical resistance of this current path.

The present invention, in its various aspects as detailed below, has one or more of a number of objectives. These include the minimising, preferably to substantially zero, of the possibility of the bird being conscious when its neck is cut. A further objective, which is at least partly connected to the above objective, is to minimise the electrical resistance in an electrical stun and/or kill process and to make this resistance as consistent as possible. Minimising the voltage means that the electrical safety of the system in case of accidental contact by operators is improved. Low voltage requirements also mean that electrical equipment reliability is likely to be improved. Making the resistance consistent means that the current flowing through the bird for a given applied voltage is made as predictable as possible, with consequent reduction of the possibility of any bird not being effectively stunned and/or killed.

Another objective is to allow the humane stunning and/or killing of animals, especially poultry, in a normal position, ie head uppermost. A system has recently been devised (see EP-A-0584142) for restraining and conveying poultry such that the bodies of the birds are substantially localised with respect to the moving conveyor and the orientation of the birds is fixed in a predetermined direction. However, no stun/kill apparatus using this conveyor has yet been devised as far as the inventors are aware. It represents a considerable improvement in welfare terms to avoid suspending birds by their legs before they are rendered unconscious.

Another objective of the invention in one or more of its aspects is to provide apparatus and a method for stunning and killing poultry which avoids excessive wing flapping and other movement of the bird during the process. This has advantages in welfare terms and avoids damage to the carcass. In current known systems, dislocated joints, broken wings and other bones, and damage to edible meat are all problems.

A further objective of the invention is the humane restraint of the head and/or neck of animals, particularly poultry, on a conveyor system, to allow for an electrical stun/kill process to be performed on their heads/necks.

According to a first aspect of the present invention, poultry slaughter apparatus comprises:

(a) a first device for inducing a stunning electrical current to flow through the head of a bird;

(b) a device for applying an electrical voltage between the head and the rear of the bird such that a fatal electrical current passes through the heart of the bird;

(c) restraint means; and (d) a control system arranged to cause the said first device to commence operating on a given bird restrained by the said restraint means and, simultaneously or subsequently, to cause the said second device to commence operating on the said restrained bird.

It has been found that this apparatus can deliver a slaughtered bird in a short space of time with little or no wing flapping, although the bird may stiffen when the fibrillating current is applied. The slaughtered bird is limp, as compared to conventional systems where the killing stage involving exsanguination, induces "headless chicken" flapping. The apparatus involves the use of relatively low voltages, which consistently produce the desired currents.

The apparatus preferably further comprises a conveyor for conveying restrained poultry to the said stunning and slaughter devices. Most practical commercial slaughter operations, employ an automated moving production line.

The apparatus also preferably comprises a device for locating the bird's head and/or neck to facilitate operation of the first device (stunning device). This may take the form of an elongate track running substantially parallel to the conveyor and spaced from it, the track comprising first and second track elements defining between them a space dimensioned to allow the bird's neck but not its head to pass between the elements. Alternatively, the locating device may comprise a member arranged to move upwardly for engagement with the bird's breast and/or neck. In this case, when the locating device is applied at an appropriate point in the conveyor path, the bird's head and/or neck may be sandwiched between the locating device and an electrode or electrodes. One or both of the locating device and electrode(s) may move with the conveyor until a voltage has been applied to the bird's head for a specified period of time.

Preferably, the electrical stunning device includes two head electrodes for engagement with the bird's head, and the second device (the killing device) includes a body electrode for engagement with the rear of the bird's body. In this case, the apparatus may further include electrical circuitry for applying a first voltage across the said head electrodes for a first predetermined time and for supplying a second voltage between the said body electrode and a further electrode(s) for a second predetermined time.

The body electrode may take the form of an electrode which moves into place against the rear of the bird's body e.g. at its cloaca, at an appropriate point along the conveyor path.

In the current design, the said first predetermined time has elapsed before the application of the said second voltage commences, and there may be a short time delay between terminating application of the first voltage and commencing application of the second voltage. The said further electrode(s) may comprise one or both of the head electrodes. In this way, the second voltage is applied through the body and head of the bird.

The following compositions and/or constructions of electrodes are preferable:

(a) a resilient pad with an outer conductive layer;
(b) a resilient body through which pass substantially parallel elongate conductive members;
(c) an array of substantially parallel elongate conductive members movable against a resilient biassing force.

Alternatively, one or more of the electrodes may be in the form of a movable endless belt arranged to make contact with a bird as it moves along the conveyor. In this case, making the belt of a material with unidirectional conductivity may be advantageous. An example of such a material is that described above, comprising a resilient body with parallel conductive "pins" passing through it.

Another possibility is for one or more of the electrodes to be in the form of an elongate bar arranged to make sliding contact with a bird as it moves along the said conveyor. In this case it may be advantageous to divide the electrode into electrically separated segments; provided only one bird is in contact with any one segment of the bar at any one time, making it relatively simple to ensure that the current flowing through the bird is constant.

The first aspect of the invention also embraces a method of slaughtering poultry comprising:

(a) restraining a bird;
(b) inducing an electrical current through the bird's head and/or neck sufficient to stun the bird;
(c) simultaneously or subsequently applying an electrical voltage between the bird's head and/or neck and its rear, preferably its cloaca, thereby, inducing through the bird's heart an electrical current sufficient to kill it.

Optional method steps corresponding to the use of the apparatus features discussed above are also envisaged.

Fibrillation and hence killing of broiler chickens is preferably achieved by passing a current of 50 to 500 mA through the bird between a head and/or neck electrode and an electrode at the rear of the bird, preferably in contact with the cloaca. The current is more preferably 50 to 200 mA, 80 to 180 mA or 100 to 150 mA.

According to a second aspect of the present invention, a system for stunning and/or killing animals by applying an electric current includes:

(a) a conveyor for conveying the animal;
(b) a device for restraining the animal such that its head and/or neck is substantially immobilised with respect to the conveyor;
(c) a device for automatically applying an electric voltage across only the head and/or neck of the animal as it moves along on the conveyor, wherein the said electric voltage applying device comprise one or more of the following:
    (i) an electrode adapted to make sliding contact with the animal's head as the animal moves along the conveyor;
    (ii) an electrode movable substantially in synchronism with the conveyor over at least a portion of its travel;
    (iii) an electrode rail extending substantially continuously in the direction of travel of the conveyor and divided into electrically separated segments;
    (iv) a conductive endless belt, optionally in sliding contact with a segmented electrode as in (iii) above;
    (v) individual electrodes arranged to come into registry with and engage each side of the animal's head and then to travel along in synchronism with the conveyor for a given time or length of travel and then to disengage with the animal's head;
    (vi) an electrode pair assembly with a "V" shaped recess for receiving an animal's head.

There are two principal advantages of a system according to the second aspect of the invention. Firstly, the voltage required to achieve a stun or kill of an animal when applied to the head only is considerably lower compared with the water bath method. Secondly, with regard to poultry systems in particular, the resistance is more predictable when a water bath is not employed since the presence of water tends to create random additional electrical paths along parts of the surface of the bird which have been wetted.

In one possible arrangement, at least part of the voltage applying means is substantially stationary in the direction of movement of the conveying means and is arranged to make sliding contact with the animal's head as the animal moves along. The advantage of this arrangement is that it is not necessary to provide moving electrified components. For example, the animal's head could pass between two elongate electrified members so that sliding contact is made with each side of its head.

In an alternative arrangement, at least part of the voltage applying means is arranged to be moveable substantially in synchronism with the conveying means over at least a portion of the length of the conveying means.

If the electrodes are moveable, it is easier to make good contact with the animal's head, but this obviously increases the complexity of the system somewhat.

In either of the above cases, the voltage applying means may include an elongate electrode rail extending substantially continuously in the direction of travel of the conveying means and divided into electrically separated segments.

In this way, it is possible to ensure that a constant current is passed through any individual animal passing along the electrode even if there are a number of animals in contact with the electrode, by ensuring that only one animal makes contact with any one segment at any given time.

The voltage applying means may include a conductive endless belt. A belt is one of the simplest forms of moveable electrode.

Where a segmented electrode rail is used, as described above, it is possible to combine this with a conductive endless belt which is conductive of electricity only in a direction transverse to the direction of movement of the belt. The belt would preferably run across the surface of the segmented electrode rail, making electrical contact with it. Because of the unidirectional conductivity of the belt, only that portion of the belt in contact with an animal's head will conduct electricity from the segmented rail.

In this way, it is possible to combine the advantages of a moving electrode with the advantages of an arrangement where sliding contact is made with a static rail.

A further possible arrangement would be an electrode conveyor system, e.g. comprising an endless belt on which is mounted a number of discrete electrodes for contacting the animals. Such a system might have a belt on each side, with discrete electrodes moving around the respective belts in synchronism. In such a system, it would be desirable automatically to sense the arrival of an animal and guide the electrodes into contact with the animal as it moves along the conveyor. It may therefore be desirable to have some form of stacking system for the electrodes and an arrangement whereby they are picked up by some form of latching means on the endless belt or belts at an appropriate time.

In one possible arrangement, the electrodes have a "V" shaped recess for receiving the head of the animal. This provides good contact with the head, particularly if a degree of force is maintained between the electrode and the animal's head. In one arrangement, corresponding electrodes on each side of the track meet immediately prior to engaging with the animal's head and together form a "V" shaped recess.

Of course, with the above described arrangements employing individual electrodes, it is not necessary for electrodes to be mounted on a belt. In general, the voltage applying means may include individual electrodes arranged to come into registry with and engage each side of the animal's head for a given length of time or length of travel and then travel along on some conveying means which may or may not be part of the conveyor for conveying the animal, and then to disengage the animal's head after the said given time or length of travel.

According to a third aspect of the present invention, apparatus for electrically stunning and/or killing animals includes one or more electrodes of sufficiently resiliently deformable construction to conform to a degree to the shape of the contacted part of the animal. Although electrodes comprising a spongy material soaked in an electrolyte (eg brine) are known, there are problems involved with using a wet electrode, including the danger of surplus electrolyte creating unwanted paths for conduction of electricity and the possibility of the electrodes drying out fully or partially. It is therefore envisaged that the electrode will be dry and will conduct electricity by virtue of the materials from which it is constructed.

Using an electrode in accordance with the invention, the contact area with the animal is maximised without the application of undue pressure. Sufficient pressure to deform the electrodes to the shape of the appropriate part of the animal without causing undue discomfort to the animal is all that is required.

Preferably, the electrode is compressible. If the electrode is not only deformable but compressible, it is easier to apply an even force over the whole area of the electrode to ensure good contact.

In one arrangement, the electrode comprises conductive compressible material, for example a conductive foam of some sort. In an alternative arrangement, a non-conductive compressible material has a deformable surface layer, film or mesh of conductive material.

Another possibility is for the electrode to comprise an array of parallel elongate conductive members (pins) arranged so as to be movable against a resilient biassing force. For example, an array of pins with their ends defining between them a plane could be arranged such that the pins can be pressed "inwardly", ie out of the plane against a spring of some sort. This amounts to providing a resiliently deformable surface for the electrode.

In some applications it is preferable for the electrodes to have unidirectional conductivity. This may be the case, for example, in an automated system where the electrodes take the form of endless belts which the animal's head comes into contact with. In this case the belt electrodes may slide along a static conductor rail on one side of the belt, whilst the animals' heads come into contact with the opposite side of the belt. It may be desirable in this case for current not to be conducted around the entire belt.

One type of material having unidirectional properties comprises a compressible non-conductive material in which is embedded substantially parallel conductors, e.g. wires. A similar material could be envisaged which has conventional non-directional conductivity, comprising a resilient material with thin metal strands randomly distributed throughout it.

Electrodes as described above may also of course be useful in manual stunning and killing apparatus, which normally takes the form of a pair of tongs with electrodes at the ends.

According to a fourth aspect of the invention animal handling apparatus for locating an animal's head and/or neck comprises:

(a) an elongate track comprising first and second track elements defining between them a space dimensioned to allow the animal's neck but not its head to pass between the elements;

(b) animal conveying means spaced from the track and running substantially parallel to it.

It is preferred that the conveyor be arranged to convey the animal in a non-inverted position. As the animal (e.g. broiler chicken) travels along the conveyor, its neck is positioned in the track and its head/neck thereby immobilised to a degree. This may facilitate the performance of some other operation on its head/neck, e.g. the application of electrodes for a stun/kill operation.

Of course, there are many other possibilities for different uses of this apparatus. For example, with its head located in this way, the animal's head could be subjected to some kind of automatic monitoring process, or have some kind of treatment applied to it.

Preferably, means are provided for increasing or decreasing the spacing between the tracks and supporting means. This is preferably done in response to the sensed size, shape, orientation, position or attitude of the animal or of its head/neck.

It will be appreciated that the animal may be in a variety of orientations, positions or attitudes on the conveyor depending in part on the nature of the conveyor (although as stated above, it is preferred that the animal is not inverted), and also that it is desirable that animals of different size and shape be accommodated. These parameters may be sensed, either prior to the animal entering or as it enters or as it passes along the track, the spacing between the track and conveyor may be adjusted accordingly. In this way it may be possible to ensure that the animals' neck is correctly introduced into the track and/or that its head/neck are correctly positioned with respect to its body subsequent to introduction, and/or that it adopts a desired body position or attitude. For example, a broiler chicken whose neck is engaged in the track might have its head lifted to a desired height by raising the track, and/or might be encouraged to stand instead of sit on a conveyor.

It may also be desirable to provide means for moving the track transversely with respect to the conveyor in dependence on the above sensed parameters.

The entry portion of the track is desirably flared to assist entry of the animals' neck.

In one possible embodiment, the track or part of it (e.g. the entry portion) itself comprises a moveable belt or similar, which may move in synchronism with the main conveying means. This may have the advantage of facilitating the birds' passage through the system and reducing friction between the birds and the track.

One possible method of automatically adjusting the spacing between the track and conveyor is for the flared entry portion to engage with the body of the animal as it enters. This arrangement is appropriate for a system where the track is above the conveyor, although the invention is not limited to this case. The track may be supported so as to be movable generally vertically; when an animal engages with the flared entry portion of the track, the track is moved upwards until the track is aligned with the animal's neck. In this way, at least the size of the broilers is "sensed" and the track lifted automatically in dependence on the "sensed" size. This particular system will be more suited to some animals than others, but has been found to work well with broilers which are oriented with their backs towards the track as they approach on the conveyor, and which are already constrained to adopt a standing position.

Desirably, in the system described above, the flared entry portion of the track is also angled away from the conveyor, so that the initial contact with the animal, e.g. with the broiler's back, is gentle and the relative movement between the animal and track tends to gradually raise the track until it is level with the animals' neck.

Alternatively, the majority of the track may be at a fixed height and the flared entry portion pivotally mounted to the remainder of the track. A further alternative might be for the entire track to be mounted pivotally.

These two options of course have the advantage that a hinged mounting is much simpler than a mounting which allows the track to move vertically whilst remaining horizontal.

It is envisaged that other methods could be used for aligning the entry portion of the track or for adjusting the position of the track once the animal's neck is located within it. For example, electronic sensors could detect the size, shape, position, orientation and/or attitude of the animal and movement of the track or parts thereof automatically controlled according to the output from the sensor(s).

In a preferred embodiment of the invention, the conveying means comprises means for restraining the body and/or legs of the animal. In this way, the position, orientation and/or attitude of the animal is determined to a greater extent than it would be if the animal were simply sitting or standing on a conventional horizontal conveyor belt. The design of the track, and in particular those features of the track and its mounting concerned with the introduction of the neck of the animal into the track, is thereby simplified. The design of any automatic track adjustment system employing sensors would also thereby be simplified.

The apparatus may form a part of a system for stunning and/or killing animals, in which case a portion of the track may be electrified and/or the track may have electrodes mounted thereon.

It will be appreciated that the fourth aspect of the invention could be used in conjunction with a suspended bird shackle line, in which case the track would be beneath the conveyor.

It will also be appreciated that many of the concepts described in connection with each of the four aspects could be used in combination since the four aspects of the invention are all very closely related.

Further features and advantages will be apparent from the following description of four experiments and seven specific embodiments of the invention, which is given by way of example only, and with reference to the accompanying drawings in which:

FIG. 2 is a schematic side view of the apparatus of FIG. 1, showing a different part of its operation sequence;

FIG. 3 is a schematic plan view of a second embodiment of poultry stun/kill apparatus, in accordance with the second and fourth aspects of the invention;

FIG. 4 is a schematic side elevation of the apparatus of FIG. 3 with additional details;

FIG. 5 is a plan view of a third embodiment of poultry stun/kill apparatus, in accordance with the second and fourth aspects of the invention;

FIG. 6 is a schematic side elevation of the apparatus of FIG. 5 with some detail omitted;

FIG. 7 is a schematic plan view of a fourth embodiment of poultry stun/kill apparatus, in accordance with the second aspect of the invention;

Figure 1:
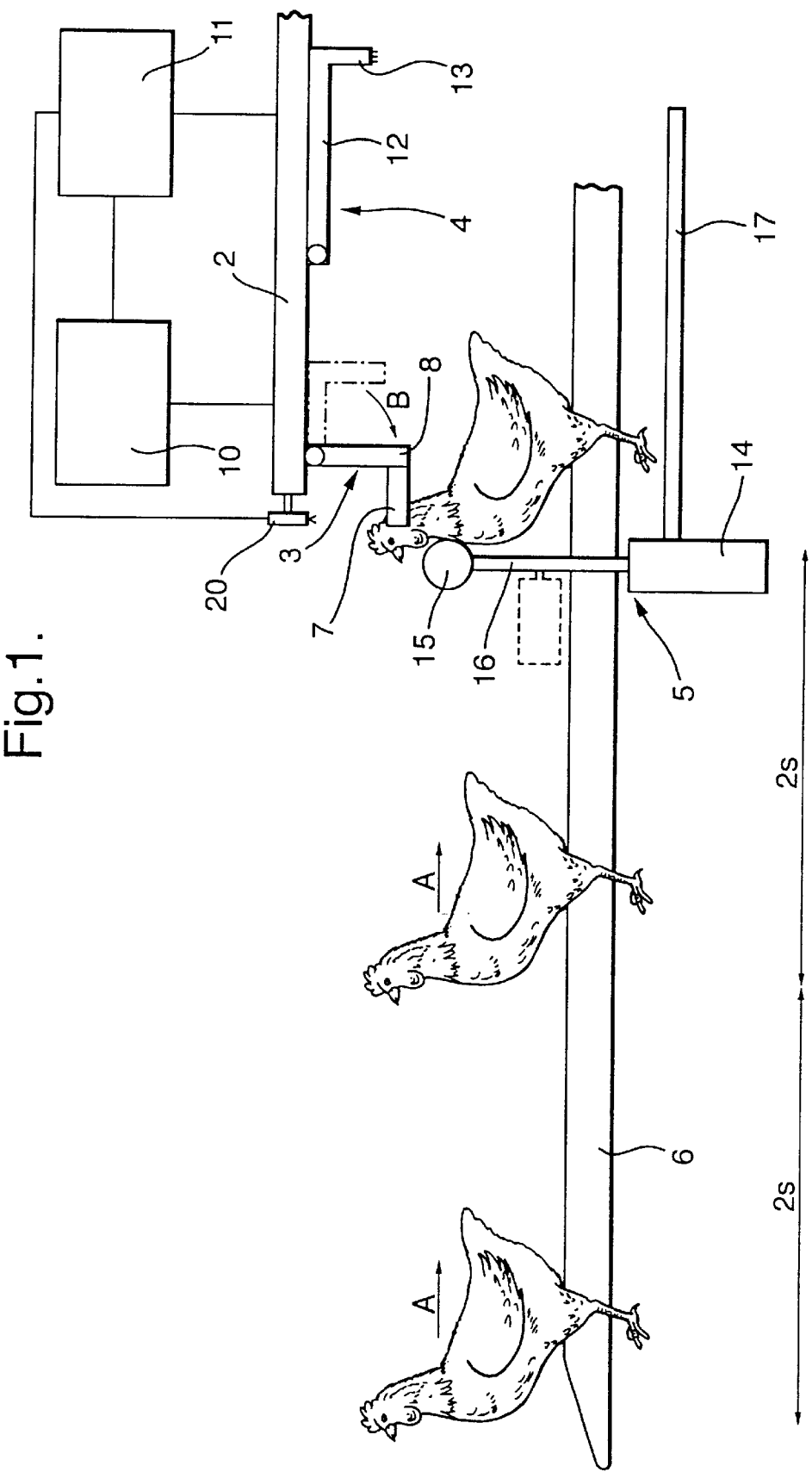
FIG. 1 is a schematic side elevation of a first embodiment of poultry stun/kill apparatus, in accordance with the first aspect of the invention.

In addition to creating the various embodiments of the invention, a certain amount of research work has been undertaken by the inventors, which will now be described.

Experiment 1

Twenty four 44-day old broilers were stunned head-only using a pair of hand held tongs fitted with electrodes 1, 2, 3, 4, 5 and 6 listed below for either 1 or 4 seconds. A constant current stunning device developed at Silsoe Research Institute was used to deliver 50 Hz current at 158 mA. The current profile during the application was recorded using a Tcac R-71 on to a tape. Fluke meters, connected in parallel to the stunner, were used to measure the average voltage and current delivered to the birds. The effectiveness of stunning was subjectively determined following the stunning based on clonic and tonic spasms and the protrusion of the $3^{rd}$ eye-lid. The birds were killed by neck dislocation prior to recovery of apparent consciousness.

Electrodes

1. Wire mesh (1 sq. mm; Multishield, RFI shielding Ltd., Braintree, Essex) filled with dry foam.
2. Aluminium plate with horizontal serrations, pitch 8 tpi.
3. 4×4 mm diameter steel bar, pitch 15 mm.
4. 2×10 mm diameter steel bar pitch 20 mm.
5. Flat MS plate.
6. Wire impregnated foam strip (Wires embedded in silicone, RS Electronics Ltd) mounted over electrode type 1.

Electrodes were placed on the head, perpendicular to the beak, whilst the birds were hung on a metal shackle and firmly held prior to the application of stunning.

TABLE 1

| Electrode type | Voltage (V) | | Current (mA) | | Estimated impedance (Ω) | |
|---|---|---|---|---|---|---|
| | Peak | Avg. | Peak | Avg. | Peak | Avg. |
| Set 1 | | | | | | |
| Broiler 1 (4s) | 32 | 32 | 160 | 157 | 200 | 203 |
| Broiler 2 (4s) | 35 | — | 166 | 158 | 210 | — |
| Broiler 3 (1s) | 24 | — | 160 | 158 | 150 | — |
| Broiler 4 (1s) | 33 | — | 189 | 155 | 179 | — |
| Set 2 | | | | | | |
| Broiler 1 (4s) | 120 | 102 | 160 | 158 | 750 | 646 |
| Broiler 2 (4s) | 112 | 94 | 162 | 158 | 690 | 595 |
| Broiler 3 (1s) | 142 | — | 160 | 158 | 890 | — |
| Broiler 4 (1s) | 116 | — | 163 | 158 | 712 | — |
| Set 3 | | | | | | |
| Broiler 1 (4s) | 80 | 58 | 162 | 156 | 493 | 371 |
| Broiler 2 (4s) | 57 | 46 | 159 | 156 | 358 | 294 |
| Broiler 3 (1s) | 80 | — | 159 | 154 | 503 | — |
| Broiler 4 (1s) | 78 | — | 189 | 168 | 412 | — |
| Set 4 | | | | | | |
| Broiler 1 (4s) | 54 | 38 | 160 | 157 | 337 | 242 |
| Broiler 2 (4s) | 60 | 54 | 192 | 157 | 312 | 343 |
| Broiler 3 (1s) | 46 | — | 161 | 160 | 285 | — |
| Broiler 4 (1s) | 61 | — | 162 | 154 | 376 | — |
| Set 5 | | | | | | |
| Broiler 1 (4s) | Misstunned | | | | | |
| Broiler 2 (4s) | 66 | 47 | 160 | 158 | 412 | 297 |
| Broiler 3 (1s) | 91 | — | 160 | 158 | 568 | — |
| Broiler 4 (1s) | 83 | — | 162 | 158 | 512 | — |
| Set 6 | | | | | | |
| Broiler 1 (4s) | 71 | 46 | 166 | 158 | 427 | 291 |
| Broiler 2 (4s) | 82 | 37 | 164 | 158 | 500 | 234 |
| Broiler 3 (1s) | 138 | — | 160 | 158 | 862 | — |
| Broiler 4 (1s) | 60 | — | 166 | 158 | 361 | — |

Experiments 2–4

Using a static restraining rig, currents of about 80 mA, 50 Hz AC were applied to the head and cloaca of broilers. The head electrodes comprised wire mesh over resilient foam, of size 40 mm×40 mm, mounted on hand held tongs. For the fibrillation experiments only one head electrode was connected to the electrical circuit. A variety of electrodes were held in place to contact the cloaca of the bird.

Cloacal electrodes tried initially were rigid, and bent from 22 mm dia copper water piping with an upward (ski-jump) curve. Subsequently multi-spring-loaded-pin electrodes were tried. This electrode was made by using commercially available spring-loaded pins with conical heads (nominal 4 mm diameter, 7 mm travel) fitted into a carrier so that the 19 pins were in a centre and two concentric circle arrangement of nominal 10 mm and 20 mm pitch circle diameters, PCD. Although up to 19 pins could be fitted only four were used (centre and three equi-spaced in 20 mm PCD)

Final trials were undertaken as a two-stage stun-kill operation using two constant current stunners, connected, via timed relay switches, to provide a head only stun followed by a head-cloaca fibrillation.

The stunners used were constant current units developed at Silsoe Research Institute, and built for experimental use at Bristol University. Both models are based on electronically controlled constant current supplies, and have adjustable frequencies as well as current levels.

Experiment 2

Nine anaesthetised birds fitted with ECG electrodes and were placed in the restraining rig singly. The bird's head was supported by hand until adequately gripped by the tongs with conformable/compressible electrodes. The pre-set current, set using a dummy-load resistance of 1360 ohm, was then applied for the required duration and the ECG recorded. The relays incorporated timers and so accurate durations were possible. The results are given in Table 2.

TABLE 2

| Bird No. | Frequency Hz | Current mA | Duration s | Result |
|---|---|---|---|---|
| 1 | 50 | 32 | 1 | No fibrillation, only disrythmic |
| 2 | 50 | 142 | 1 | Fibrillation |
| 3 | 50 | 142 | 1 | Fibrillation |
| 4 | 50 | 102 | 4 | Fibrillation |
| 5 | 50 | 102 | 1 | Fibrillation |
| 6 | 50 | 102 | 0.5 | Fibrillation |
| 7 | 50 | 102 | 0.25 | Not fibrillated |
| 8 | 50 | 80 | 1 | Fibrillation |
| 9 | 50 | 80 | 0.5 | Fibrillation |

Experiment 3

Studying the results of the second experiment suggested that a current of 102 mA applied for 0.5 second would ensure a margin of safety for fibrillation. Earlier trials had shown that for stunning a 100 mA current applied to the head, via the conformable (foam filled mesh) electrodes, gave a satisfactory stun. It was felt than an equal current level (100 mA) and waveform (50 Hz) for the two phases would simplify the equipment required. Two constant current stunners were used connected trough three timed relays in order to give a period of head-only stunning, a pause period and the fibrillation cycle. A dummy load of 300 ohm was used to pre-set the stun current and a dummy load of 1360 ohm was used to pre-set the fibrillating current.

This trial used nine conscious birds which were not fitted with ECG electrodes. The birds were placed in the restraining rig as before with the cloaca in good contact with the copper pipe electrode. Again the hand-held tongs with foam filled electrodes were applied to the head. The results, particularly with the copper pipe electrode were not satisfactory. Initially it was thought that wing flapping and movement during restraining may cause problems with locating the bird so some birds had their wings bandaged. In fact it was rarely a problem but was used after some birds also lost contact with the cloacal electrode and the fibrillating current was disrupted. However it was determined that the main problem was that the bird forced itself up and lost contact with the cloacal electrode during fibrillation. The stunning cycle caused the bird to be limp but the fibrillation cycled stimulated the birds muscles and caused it to become extended and rigid and its feet contacted the restrainer's support and pushed the body up so that it lost contact with the pipe electrode.

Attempts were made to change the position of the electrode and also to use the multi pin electrode.

TABLE 3

| Bird No | Band-aged? | Stun mA 50 Hz | Dura-tions | Pause | Fibril-late mA 50 Hz | Dura-tions (plan-ned) | Result and comments |
|---|---|---|---|---|---|---|---|
| 10 | Yes | 100 | 1 | Minimal | 102 | 0.5 | Stunned but recovered |
| 11 | No | 100 | 1 | Minimal | 102 | 1 | Stunned and fibrillated |
| 12 | No | 100 | 1 | Minimal | 102 | 1 | Stunned but recovered |
| 13 | No | 100 | 1 | Minimal | 102 | 1 | Stunned but recovered |
| 14 | No | 100 | 1 | Minimal | 102 | 1 | Raised pipe by c.2.5 cm to try to maintain contact. Stunned and fibrillated. |
| 15 | No | 100 | 1 | Minimal | 102 | 1 | Stunned but not fibrillated. Electrode still raised |
| 16 | No | 100 | 1 | Minimal | 102 | 1 | Stunned but not fibrillated. Large serrated prongs (from pig stunning tongs) used as cloaca electrode |
| 17 | No | 100 | 1 | Minimal | 102 | 1 | Used pin type electrode. Stunned and fibrillated |
| 18 | No | 100 | 1 | Minimal | 102 | 1 | Used pin type electrode. Stunned and fibrillated |

Experiment 4

Having determined that the birds were being stimulated by the fibrillating current and forcing themselves up and off the cloaca electrode the restraining rig was modified to offer more clearance. In addition the pin type electrode was pendulum mounted.

The unit was again used with the two stunners connected as before via the timed relays but the stunning and fibrillating currents were increased to 150 mA to provide an even greater margin of safety.

One bird was not satisfactorily fibrillated. It was likely that insufficient load on the pendulum arm prevented the pins from penetrating the feather cover satisfactorily.

TABLE 4

| Bird No. | Stun mA 50 Hz | Dura-tions | Pause | Fibrillate mA | Durations (planned) | Result and comments |
|---|---|---|---|---|---|---|
| 1 | 150 | 1 | c.0.5 | 150 | 0.5 | Stunned and fibrillated |
| 2 | 150 | 1 | 0.25 | 150 | 1 | Stunned but not fibrillated. Likely poor rear contact |

TABLE 4-continued

| Bird No. | Stun mA 50 Hz | Dura-tions | Pause | Fibrillate mA | Durations (planned) | Result and comments |
|---|---|---|---|---|---|---|
| 3 | 150 | 1 | 0.5 | 150 | 1 | Stunned and fibrillated |
| 4 | 150 | 1 | 0.25 | 150 | 1 | Stunned and fibrillated |
| 5 | 150 | 1 | c.0 | 150 | 1 | Stunned and fibrillated |

Referring now to FIGS. 1 and 2, an automated electrical stunning and killing system for poultry is shown comprising a conveyor (not shown) and an overhead track 2 with electrode assemblies 3, 4 mounted on it. In addition a device 5 is provided for assisting the bird's heads into contact with head electrodes. The conveyor will not be described in great detail here since it is the subject of another patent publication EP-A-0584142, but it comprises essentially moving means (not shown) for restraining the birds' feet and a static member 6 arranged to pass between the birds' legs as they move along and thereby urge the birds into a standing position. As will be appreciated from the experimental work described above, it is desirable that the conveyor does not restrain the legs in such a way that the birds can push upwardly with their legs.

Prior to having their legs shackled in the moving leg restraint, the birds are oriented so that they all face in the same direction by means described in EP-A-0584142. It is envisaged that once the electrical stun and kill process described below has been completed, the carcasses may be transferred to a suspended shackle line for subsequent processing by conventional machinery.

The foremost of the two electrode assemblies shown in FIGS. 1 and 2 is the stunning electrode assembly 3 which is applied to the head of the bird; it in fact comprises a pair 7 of electrodes arranged in a "V" format when viewed in plan, with the open end of the "V" directed towards the bird. This is not shown in FIGS. 1 and 2, but the shape of the electrode pair is similar to that of the electrode pairs of the fourth embodiment shown in FIG. 7. The electrode pair 7 is mounted at the end of a support frame member 8 which is mounted to the track 2 via an arrangement 9 of conventional form allowing the frame 8 both to pivot and to slide along the track 2. The electrode pair 7 is electrically connected to an electrical supply 10, and the frame 8 is connected mechanically to means (not shown) for driving the assembly 3 along the track in synchronism with the conveyor 1. A controller 11 is provided to govern the switching in and out of the electrical supply to the electrode pair 7 and to govern the movement of the frame 8 on the track 2.

The contact surfaces of the electrode pair 7 are smooth metal, but in a modification of this embodiment could be provided by thin conductive metallic mesh bonded to the metal electrode, and encasing a resilient plastics foam layer. The details of this construction are not shown, but may be similar to the construction of the electrodes of the sixth embodiment (see FIG. 11)

The rear electrode assembly 4 comprises a rear support frame 12 mounted for pivoting and sliding movement to the track 2. At the end of the frame 12 is mounted an electrode 13 adapted for making contact with the cloaca of the bird. The cloaca or rear electrode 13 is similarly connected to the electrical supply and the frame 12 connected to means for moving the assembly along the track 2. As with the stunning electrode assembly, the controller 11 governs the switching in and out of the electrical supply to the electrode 13 and also governs the movement of the frame 12 on the track 2. The tip of the rear electrode takes the form of an array of sprung pins whose ends together define a resiliently deformable surface. The detail of the electrode is shown in FIG. 2a; a hollow body 18 is provided with bores in which are received pins 19 which are slidable in the bores against the bias of resilient means (not shown) in the body 18.

Mounted on the front of the track 2 is a sensor 20 for detecting when a bird passes beneath it. The sensor may be of any convenient type, eg a light beam and photocell, infra red detector, etc. Its may be arranged to detect the passing of the bird's head or the rear end of its body.

Situated to one side of the conveyor 1 is the device 5 for facilitating engagement of the head in the head electrodes 7. This device could take a number of forms but in this embodiment comprises a hydraulic actuator 14, with a vertically displaceable shaft 16 on the end of which is mounted a soft, resilient roller 15. The roller 15 is designed to be comfortable for the birds. The shaft 16 is also pivotable about its own (vertical) axis. A further actuator (not shown) is provided to pivot the shaft 16 and thus to swing the roller 15 into and out of the path of birds moving along the conveyor 1. The cylinder is also movable along a track 17. The functioning of this device is also governed by the controller 11.

The operation of the apparatus will now be described. Birds travel along the conveyor 1 in the direction of arrows A. The conveyor ensures that the birds are all oriented in the same direction, facing backwards on the conveyor with respect to the direction of motion. The design of the conveyor is such that the birds are all standing, and the birds' bodies are thus all in substantially predictable positions. The heads and necks of the birds are, however, not restrained. The conveyor also ensures that the birds are spaced by a given interval, in this case approximately 2 seconds.

When the rear end of a bird reaches the sensor 20, an appropriate time interval is allowed to pass to allow the head to reach the stunning electrode assembly 3, before the roller device 5 is activated. The controller 11 then sends a signal to the head lifting device causing it to move from its rest position (as shown in broken lines in FIGS. 1 and 2). The resilient roller 15 first pivots on the shaft 16 until the roller extends across the conveyor path, over the top of the static conveyor member 6. The actuator 14 then moves the roller 15 upwardly such that the roller first engages gently with the bird's breast. Although the position of the bird's head and neck is not known, the roller advances upwardly in contact with the breast, and is wide enough that it will meet the neck, whatever position it is in, and ensure that the neck is in an upright position.

At this point, or perhaps somewhat before, the stunning electrode assembly 3 swings down (arrow B) from its rest position into a position in the path of the birds' heads (once lifted by the roller device 4), and waits there for a short interval of time whilst the roller engages with the bird. The electrical supply to the electrode assembly 3 is switched on.

The roller 15 continues its upward movement and meets the head, and the timing of the activation of the roller device is such that this occurs just as the head comes into contact with the stunning electrode assembly. The "V" shape of the electrode pair 7 ensures that the head is centred as it is pressed gently into the electrode.

Whilst the device 5 is moving upwards, and after it has stopped moving upwards and is maintaining the head in contact with the stunning electrode assembly 3, the electrode assembly 3 is moving backwards along the track 17 in synchronism with the conveyor.

The constant current electrical supply remains switched on for a period of one second, at a voltage which is automatically varied to be sufficient to induce a current of approximately 150 mA through the head only of the bird, reliably causing stunning. This voltage is typically about 30–100V. When the foam and wire mesh electrodes are used, it tends to be at the lower end of this range; say 30–40V. The supply is then switched off, although the stunning electrode pair 7 and head lifting device remain in engagement with the bird's head.

The rear electrode assembly 4 then swings down and makes contact with the cloaca of the bird. Simultaneously, a voltage is applied between the rear electrode 13 and the stunning electrode pair 7 (the electrodes of the pair now being at the same electrical potential). The voltage applied is sufficient to induce a fatal current of 150 mA through the body of the bird and, in particular, through the heart, causing fibrillation. This is maintained for a further one second, and at the end of this time the electrodes and head lifter are withdrawn by pivoting upwardly in the case of the electrode assemblies and rotating out of the conveyor path and moving downwardly in the case of the head lifter. They then move along their respective tracks back to their rest positions ready to receive the next bird.

The carcass of the slaughtered bird continues along the conveyor to be transferred to a suspended shackle line, by manual means, or as described in EP-A-0584142, for further processing.

Referring now to FIGS. 3 and 4, the second embodiment of poultry stun/kill apparatus comprises a conveyor of known type which is described in EP-A-0584142. The contents of this publication are incorporated herein by reference. The conveyor 31, which is not shown in any great detail, comprises a shackle line which restrains the birds' feet whilst moving the birds along in the direction of arrow C, and a static member which passes between the birds legs and causes them to adopt a standing position. As they travel along on the conveyor 31, the birds approach a neck/head restraining track 34 comprising two parallel track elements 34A, 34B. A front portion 35 of the track is outwardly flared and hinged to the remainder of the track at a pivot point 36. The front entry portion 35 on the track is hinged downwardly in a position shown by the reference 35A in FIG. 4 until it is contacted by a bird 32 passing along the conveyor. The entry portion 35 will always contact the bird's back, since the birds will be arranged to face backwards with respect to direction of travel of the conveyor, again using means described in EP-A-0584142.

Above the track 34 is a reciprocating electrode arrangement comprising a reciprocating conveyor 39 on which is mounted an electrode gantry 38 which in turn has electrodes 37 mounted on it so as to be moveable inwardly and outwardly transverse to the direction of movement of the birds on conveyor 31 and the direction of movement 40 of the reciprocating conveyor 39. Also mounted on the conveyor 39 is a sensor 41 for detecting when a bird passes underneath it. The sensor may be of any convenient type, e.g. a photo-cell detecting a beam of light broken by the bird as it passes along the conveyor.

An electronic control unit (not shown in the drawings) receives an input from the sensor 41 and is programmable to set different speeds for the conveyors 31, 39, different supply voltages to the electrodes 37 and different dwell times for the electrodes to be in contact with the birds' heads. Outputs from the control unit lead to hydraulic or electrical actuators (not shown) for moving the electrodes 37 on the gantry 38 and for driving the conveyors 31 and 39.

In operation, birds will be delivered to the conveyor 31 by means disclosed in EP-A-0584142 so that they are facing backwards with respect to the direction of travel of the conveyor 31. The design of the conveyor 31 ensures that the birds are standing. As they move along in the direction of arrow C in FIG. 4, they will encounter the entry portion 35 of the head restraining track 34. When a bird's back contacts the entry portion 35, the entry portion will be lifted and will rest on the bird's back and guide the bird's neck into the narrow parallel portion of the track as shown in FIG. 3. The track 34 is sufficiently narrow that the bird-is not able to remove its head from the track, and its head is therefore located sufficiently accurately for the electrodes to be applied as described below.

As a bird passes beneath the sensor 41, the control unit signals the actuator which moves the electrodes 37 on the gantry 38 to cause the electrodes 37 to come together against the bird's head. The control unit takes into account the conveyor 31, which has been set previously, when timing the signal to the actuator.

Once the bird's head is engaged, the control unit signals the actuator/drive for the reciprocating conveyor 39 to move the gantry 38 in the direction of arrow C in synchronism with the conveyor 31. Whilst the gantry 38 is moving, current continues to flow through the bird's head. As the electrode gantry 38 reaches the end of the reciprocating conveyor 39, or alternatively earlier if current need only be applied to the bird's head for a shorter period of time, the control unit signals for the electrodes 37 to move apart again on the gantry 38 and the gantry 38 returns to the front of the reciprocating conveyor 39 in readiness for the next bird.

The stunned bird 32 then passes out of the neck restraining track 34 and proceeds along the conveyor in the direction of arrow C into further processing machinery.

It will be apparent that the spacing of the birds, the speed of the conveyor 31, the length of the reciprocating conveyor 39 and the time for which current needs to be applied are all related. In the simplest form of the apparatus, the speed of conveyor 31 and the voltage applied at the electrodes 37 would be such that the distance over which the electrode gantry 38 moves need be only the length of a bird or less. In this case, the birds may be so close together on the conveyor 31 that they are almost touching and the apparatus will still function. Alternatively, some form of control must be exercised over the spacing of the birds on the conveyor so that the processing of one bird and returning of the gantry 38 to the front of the reciprocating conveyor 39 can be accomplished before the next bird arrives at sensor 41.

The third embodiment of the invention is illustrated in FIGS. 5 and 6. Similar reference numerals have been used to designate similar parts. This embodiment is the same as the second embodiment inasmuch as the birds travel along a conveyor 31 with their legs in a shackle line (not shown) and being forced to adopt a standing position by stationary member. A head restraining track 34 is provided, as in the second embodiment, with a pivoted and flared inlet portion 35.

The difference with the second embodiment is in the construction of the means for applying electric current to the birds' heads. In this embodiment a stationary electrode track is provided parallel to the neck restraining track 34 and slightly above it. The electrode track is in fact mounted by means of mountings 44 on the neck restraining track 34. The electrode track comprises two elongate electrode rails 42, 43 which are arranged to engage respective sides of the birds' heads as they pass along on the conveyor 31. In practice, the spacing between the electrode rails 42, 43 will be slightly greater than the spacing between the neck restraint elements 34A, 34B, but will be sufficiently small that a certain amount of pressure is applied to the bird's head when it enters the space between the rails to ensure a good electrical contact.

One of the rails 42 is divided into segments 42A–42E. A source of electrical power 46 supplies the 12 segments 42A–42E separately along power lines 45A–45E. The segments 42A–42B are electrically insulated from each other by thin segments of insulating material, but the surface of the rail 42 is essentially continuous.

The other rail 43 is a simple continuous conductor and forms the electrical return.

The operation of this system will be largely understood from the above description and from the drawings. The birds approach the restraining track 34 and enters it in the same manner as described above in connection with the second embodiment. With their heads thus restrained, they pass between the electrode rails 42, 43, with a slight pressure being applied to each side of the bird's head by virtue of the size of the gap between the electrode rails 42, 43.

As the birds pass along the track, they receive the same voltage whichever of the segments 42A–42E they are in contact with. The current passing through their heads is thus substantially constant as they move along the length of the track, interrupted only briefly when they pass the thin pieces of insulating material between the conducting segments.

The result of this arrangement is that a number of birds can be passing between the electrode rails 42, 43 at the same time without affecting the current passing through each bird's head. The segments 42A–42E are sufficiently short that it is impossible for two birds to be passing along the same segment at the same time. As an alternative, the segments could be longer, providing the spacing between the birds on the conveyor was controlled to ensure that only one bird would ever be in contact with any given segment at a given time.

The fourth embodiment as shown in FIG. 7, with similar reference numerals designating similar parts to the previous two embodiments.

The problem with the third embodiment with its sliding contact, is the possibility that an insufficiently good contact will be made with the birds' head. The fourth embodiment comprises the same head/neck restraint 34 and conveyor (not shown in FIG. 7). It also has a segmented electrode rail 42 as in the third embodiment, with separate power lines 45A–45D supplying the separate segments 42A–42D of the electrode rail 42. In this embodiment, however, the second electrode rail 43 is replaced with a series of individual electrode assemblies 47 mounted on an endless belt electrode conveyor 48.

Each assembly 47 comprises a main member 49 mounted on the belt 48 via a releasable latch mechanism (not shown). The member 49 is in two parts, separated by a thin piece of insulating material 54. Extending from the main member 49, one on each side of the insulating material 54, are two projections 50 defining a "V" shaped recess. At the end of the member 49 remote from the conveyor 48 is a conducting "shoe" adapted to make sliding contact with the electrode rail 42.

Generally shown at 51 in FIG. 7 is an electrode assembly accumulator, the detail of which is not shown, but which allows the electrode assemblies to be stored adjacent to the electrode conveyor 48 and, at an appropriate time, latched onto the conveyor and moved around into the path of oncoming birds. The conveyor 48 moves around in the direction of arrows 52. As a bird enters the apparatus travelling from right to left in FIG. 7 (in the direction of arrow C) an electrode assembly latches onto the conveyor 48 and passes around the right-hand end of the conveyor 48 as shown in FIG. 7 making contact with segment 42A of the electrode rail 42. The bird 32, travelling along conveyor 31, comes into contact with the electrode assembly, with its head lodging in the "V" shaped recess. The electrical path which had previously been interrupted by the insulating material 54 is then completed and current flows through the bird's head.

In this embodiment, means are necessary for accumulating the electrode assemblies 47 and also for ensuring that the speed of travel of the assemblies is variable on the belt conveyor 48 so that, at the start of the cycle, the electrode assembly can "drop" down in front of the bird and then be "caught up" by the bird so that the bird's head engages in the recess. Means for doing these things are by no means beyond those skilled in the relevant art, however, and the techniques used in this embodiment need not be described in detail.

The advantages of this arrangement over the previous ones are that multiple birds can be processed simultaneously on a single line, whilst the potential problems of making a good contact with the bird's head, which might be encountered with the sliding electrode method, are obviated.

Figure 8:
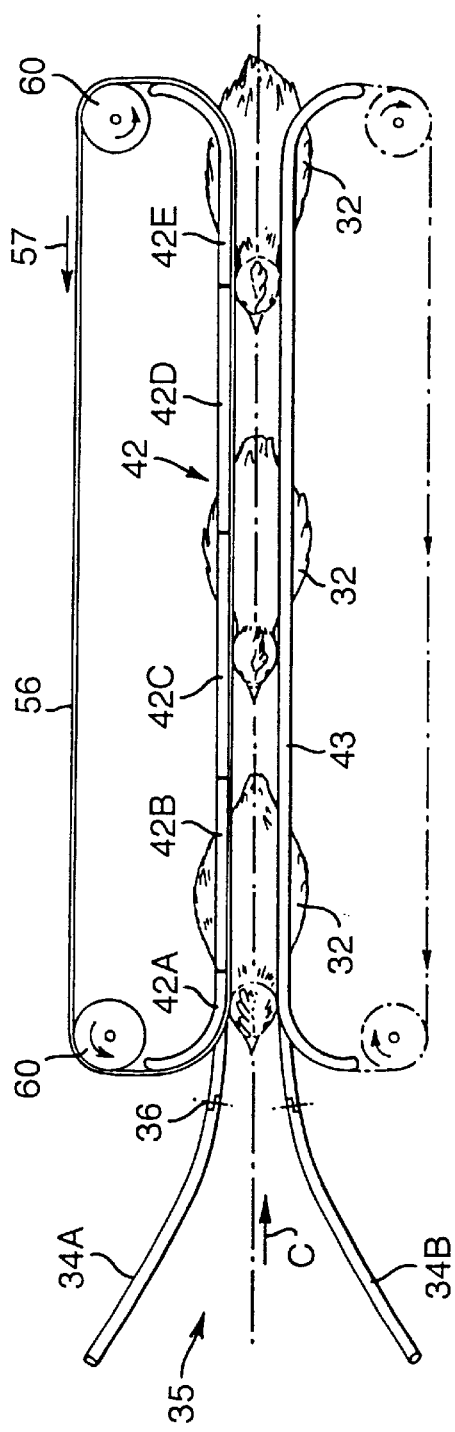
FIG. 8 is a schematic plan view of a fifth embodiment of poultry stun/kill apparatus, in accordance with the second and third and fourth aspects of the invention.
Figure 9:
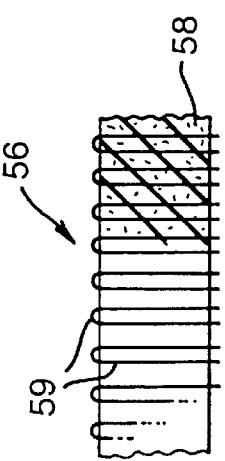
FIG. 9 is a cross-sectional view through the material of the electrode belt shown in FIG. 8.

The fifth embodiment is shown in FIG. 8 and 9. Similar numbering has been used for similar parts. In this system, a neck restraining track comprising track elements 34A, 34B, with a flared entry portion 35 which is hinged at a pivot point 36, is again used. The segmented electrode rail 42 and electrode rail 43 are also used, but in this embodiment a conductive belt is employed which runs in front of the segmented electrode rail 42 as shown in FIG. 8.

The belt is of a construction which provides unidirectional conductivity of electricity. A cross section through the material from which the belt 56 is made is shown in FIG. 9. The main mass 58 of the belt is made from a non-electrically conductive flexible resilient material such as neoprene rubber or similar. Extending through the width of the belt material are "U" shaped metal "pins". As shown in FIG. 9, the free ends of the "U" and the curved end are very slightly proud of the surface of the main mass 58 of resilient material. The belt is arranged so that the curved ends make sliding contact with the electrode rail 42, whilst the slightly "prickly" opposite surface makes contact with the birds' heads as they pass through the system. The pins are flexible, so that they do not inhibit the main mass of the material being compressed in the transverse direction.

In operation, the belt rotates in the direction of arrows 57 around rollers 60, namely in the same direction as that of the main conveyor and the direction in which the birds are travelling. It has been found that the type of material from which the belt is made makes excellent contact with the bird's head, and the unidirectional conductivity of the material means that electric current is only conducted to the bird's head from that segment of the conducting rail 42 adjacent to the bird's head: the advantages of the segmented rail 42 are thus maintained.

In an improved version, another belt would be provided on the other side of the track making contact with the continuous electrode rail 43.

In this embodiment, the belt 56 is driven via rollers 60 around which it extends. However, it will be appreciated that driving the belt is not strictly necessary and that it may be sufficient for the birds' heads to make contact with the belt and move it around as they travel along the conveyor 31.

Figure 10:
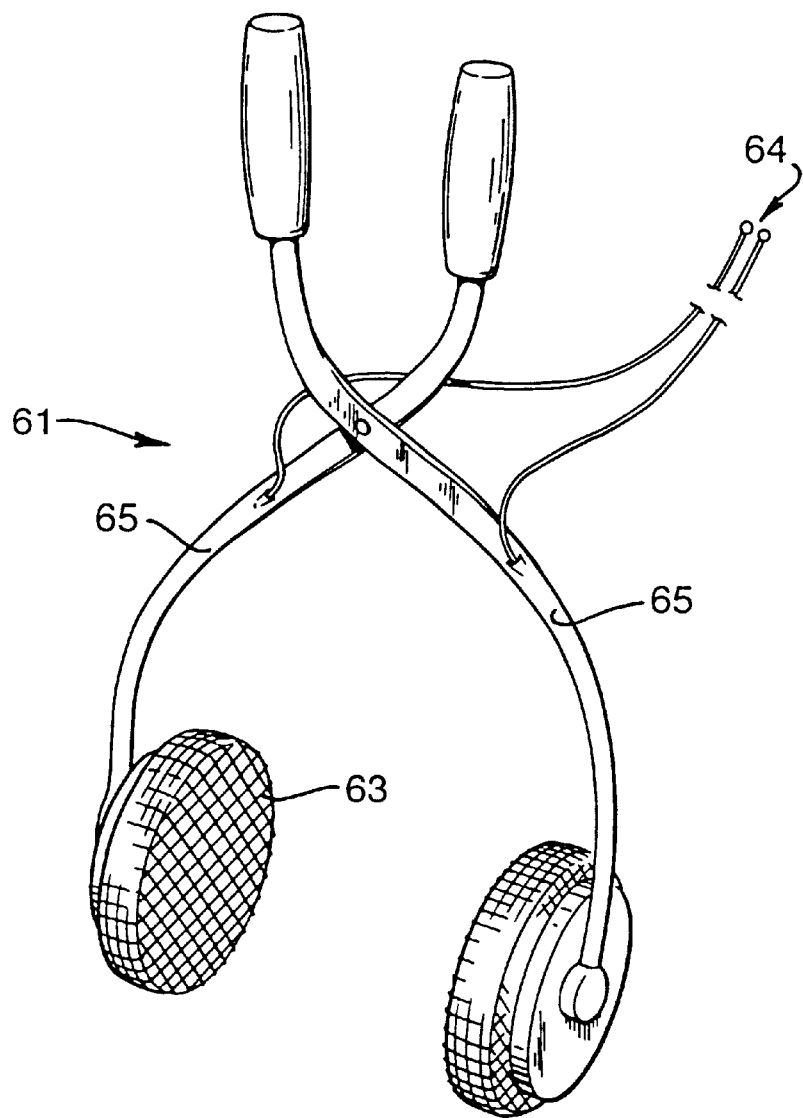
FIG. 10 is a schematic perspective view of a sixth embodiment (a pair of poultry stunning tongs), in accordance with the third aspect of the invention.
Figure 11:
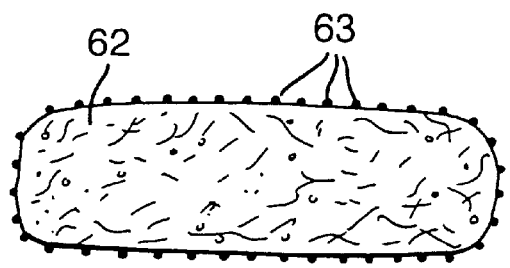
FIG. 11 is a schematic cross section through one of the compressible electrodes of FIG. 10.

A sixth embodiment of the present invention is shown in FIGS. 10 and 11; this is another use for the resilient electrodes of the third aspect of the invention. A pair of tongs 61 is shown in FIG. 10. Tongs for applying an electrical stunning or killing current to an animal are well known in themselves, but those shown in FIG. 10 are fitted with electrodes consisting of pads of compressible foam material 62 such as Neoprene rubber surrounded by a conductive gauze or mesh 63.

An electric supply 64 is connected to the arms 65 of the tongs which are in contact with the mesh 63 on the rear of the electrode pads.

There would, of course, be some form of insulation on the upper part of the tongs to allow them to be gripped by the operator's hand. In use, the tongs would be applied to each side of, say, a broiler chicken's head. The wire gauze or mesh would deform and the foam pad 62 would compress to accommodate the shape of the broiler's head, thus ensuring an excellent contact and thus low contact resistance.

Clearly the lower the resistance, the lower the voltage required and the safer the operation is for the operator. It has also been found that the use of this type of electrode results in a more consistent stunning current being applied.

It will be appreciated that there are many variants of the above embodiments—for example it will be appreciated that an electrode of the sort of material used in the sixth embodiment may be used in the fifth embodiment if unidirectionality is not necessary.

Figure 12:
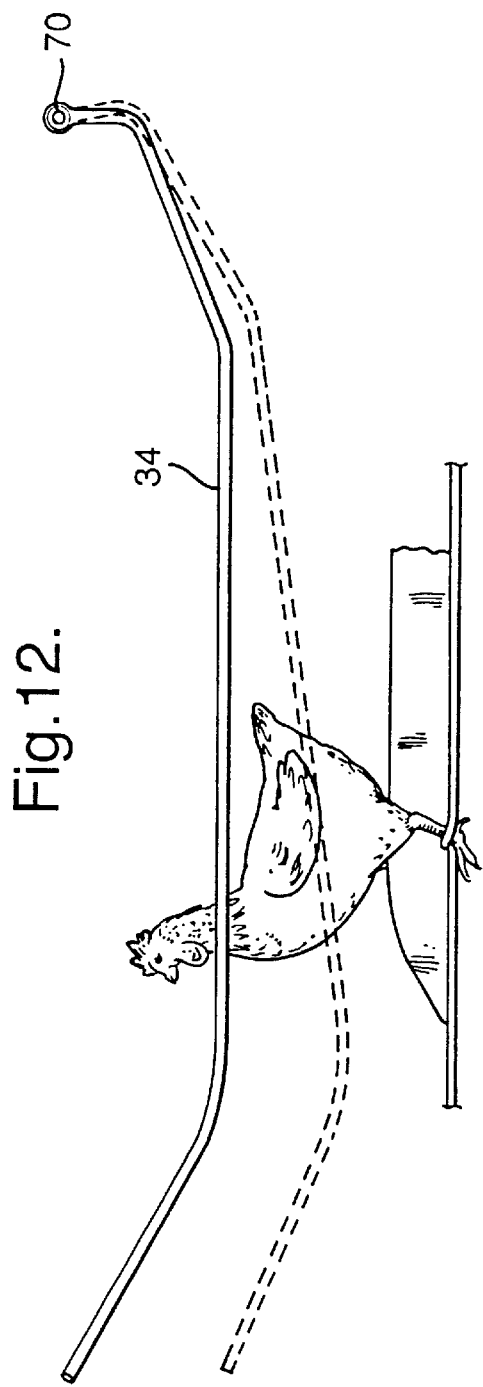
FIG. 12 is a schematic side elevation of a seventh embodiment (poultry handling apparatus), in accordance with the fourth aspect of the invention.
Figure 13:
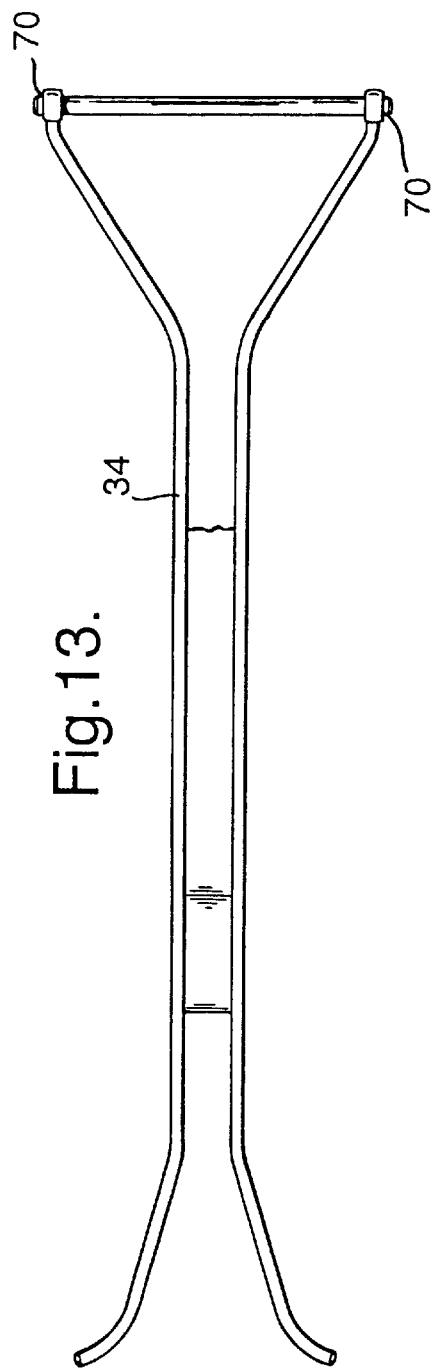
FIG. 13 is a plan view of the apparatus of FIG. 12, omitting some detail.

FIGS. 12 and 13 show a seventh embodiment of the invention—an alternative construction for the track 34 described above in connection with the second, third, fourth and fifth embodiments. In this modified version the track is hinged at the exit end at pivot points 70. Other arrangements for the track are possible; for example, it may be supported so as to be vertically movable parallel to the conveyer 1 as opposed to being hinged or having an element of it hinged. In this embodiment, the track (or its movable part) are not moved by any powered actuator means, but an alternative would be for the movement of the track to be powered, e.g. hydraulically in response to signals from electronic sensors sensing the position, size, etc. of broilers on the conveyor.

What is claimed is:

1. Poultry slaughter apparatus comprising:
   (a) a first device for inducing a stunning electrical current to flow through the head of a bird;
   (b) a second device for applying an electrical voltage between the head and the rear of the bird such that a fatal electrical current passes through the heart of the bird;
   (c) restraint means; and
   (d) a control system arranged to cause the said first device to commence operating on a given bird restrained by the said restraint means and, simultaneously or subsequently, to cause the said second device to commence operating on the said restrained bird.

2. Slaughter apparatus as claimed in claim 1 further comprising a conveyor for conveying restrained poultry to the said first and second devices.

3. Slaughter apparatus as claimed in claim 2 comprising a locating device for locating the bird's head and/or neck to facilitate operation of the said first device.

4. Slaughter apparatus as claimed in claim 3 wherein the said locating device comprises an elongate track running substantially parallel to the conveyor and spaced from it, the track comprising first and second track elements defining between them a space dimensioned to allow the bird's neck but not its head to pass between the elements.

5. Slaughter apparatus as claimed in claim 3 wherein the said locating device comprises a member arranged to engage with the bird's breast and/or neck to facilitate engagement of the bird's head with the said first device.

6. Slaughter apparatus as claimed in claim 1 wherein the said first device includes two head electrodes for engagement with the bird's head, and the said second device includes a body electrode for engagement with the rear of the bird's body, the first and second devices further including electrical circuitry for applying a first voltage to the bird across the said head electrodes for a first predetermined time and for applying a second voltage to the bird between the said body electrode and a further electrode(s) for a second predetermined time.

7. Slaughter apparatus as claimed in claim 6 wherein the said first predetermined time has elapsed before the application of the said second voltage commences.

8. Slaughter apparatus as claimed in claim 6 wherein the said further electrode(s) comprises one or both of the said head electrodes.

9. Slaughter apparatus as claimed in claim 1 in which the restraint means is arranged to restrain the animal without inverting it.

10. Slaughter apparatus as claimed in claim 6 wherein one or more of the said electrodes has a composition and/or construction selected from the following:
    (a) a resilient pad with an outer conductive layer;
    (b) a resilient body through which pass substantially parallel elongate conductive members;
    (c) an array of substantially parallel elongate conductive members movable against a resilient biasing force.

11. Slaughter apparatus as claimed in claim 2 wherein one or more of the said electrodes is in the form of a movable endless belt arranged to make contact with the bird as it moves along the say conveyor.

12. Slaughter apparatus as claimed in claim 2 wherein one or more of the said electrodes is in the form of an elongate bar arranged to make sliding contact with the bird as it moves along the said conveyor.

13. Slaughter apparatus as claimed in claim 12 wherein the said bar is divided into electrically separated segments.

14. A method of slaughtering poultry comprising:
    (a) restraining a bird;
    (b) inducing an electrical current through the bird's head sufficient to stun the bird;
    (c) simultaneously or subsequently applying an electrical voltage between the bird's head and rear, thereby inducing through the bird's heart an electrical current sufficient to kill it.

* * * * *